United States Patent [19]
Zertuche-Rodriguez et al.

[11] Patent Number: 5,811,069
[45] Date of Patent: Sep. 22, 1998

[54] LONG TERM-STABILIZED MAGNESIUM HYDROXIDE SUSPENSION AND A PROCESS FOR ITS PRODUCTION

[75] Inventors: Cesar-Emilio Zertuche-Rodriguez; Ricardo Benavides-Perez, both of Monterrey; Jose-Gertrudis Bocanegra-Rojas; Gabriel-Arturo Santoy-Alvarez, both of Guadalupe, all of Mexico

[73] Assignee: Servicios Industriales Penoles, S.A. DE C.V., Monterrey, Mexico

[21] Appl. No.: 810,122

[22] Filed: Feb. 25, 1997

[51] Int. Cl.$^6$ ........................................ C01F 5/14
[52] U.S. Cl. ........................................ 423/265; 423/636
[58] Field of Search ............................. 423/636

[56] References Cited

U.S. PATENT DOCUMENTS

| | | | |
|---|---|---|---|
| 3,957,674 | 5/1976 | Sano et al. | 252/182 |
| 4,155,741 | 5/1979 | Scher et al. | 71/65 |
| 4,164,521 | 8/1979 | Goodman | 525/187 |
| 4,166,040 | 8/1979 | Goodman | 252/180 |
| 4,166,041 | 8/1979 | Goodman | 252/180 |
| 4,230,610 | 10/1980 | Falcione et al. | 260/29.6 |
| 4,412,844 | 11/1983 | Collins et al. | 44/51 |
| 4,430,248 | 2/1984 | Rey | 252/313 |
| 4,548,733 | 10/1985 | Vincent | 252/310 |
| 4,743,396 | 5/1988 | Fong et al. | 252/313.1 |
| 5,143,965 | 9/1992 | Mertz et al. | 524/436 |
| 5,487,879 | 1/1996 | Witkowski et al. | 423/155 |
| 5,514,357 | 5/1996 | Richmond et al. | 423/636 |

FOREIGN PATENT DOCUMENTS

| | | |
|---|---|---|
| 592169 | 4/1994 | European Pat. Off. |
| 9603346 | 2/1996 | WIPO |

*Primary Examiner*—Wayne Langel
*Attorney, Agent, or Firm*—Abelman, Frayne & Schwab

[57] ABSTRACT

A long term stabilized magnesium hydroxide suspension which can be stored for at least six months without substantial agitation and without undergo substantial settlement nor solid hard substrate formation, comprising a solid content of about 51% to 62%; a water content of about 38% to 49%; a viscosity of about 50 to 400 cp.; an average particle size of about 1 to 2.5 microns; a $Mg(OH)_2$ content of about 50% to 60%; an equivalent magnesium oxide content of 34% to 42%; and including an anionic polyelectrolyte as a dispersant agent, and which is obtained by washing, filtering and repulping magnesium hydroxide solids to obtain agglomerated solid particles, dispersing the agglomerated solid particles by comminution in a dispersing equipment, to reduce the particle size providing a dispersed product, grinding the dispersed product to additionally reduce the particle size to about 2 microns; and adding an anionic polyelectrolyte at a concentration of at least 25%, in an amount of about 0.5 to 1.5% in dry basis, as a dispersant agent.

12 Claims, No Drawings

LONG TERM-STABILIZED MAGNESIUM HYDROXIDE SUSPENSION AND A PROCESS FOR ITS PRODUCTION

BACKGROUND OF THE INVENTION

A. Field of the Invention

This invention relates to a stabilized magnesium hydroxide suspension and more particularly to a long term-stabilized magnesium hydroxide suspension having a stability of at least six months without substantially settling and without forming a hard solid substrate, and a process for the production thereof.

B. Description of Related Art

The magnesium and particularly the magnesium hydroxide has a wide range of applications such as a flame retardant, a neutralizer for acid effluents, as well as for pharmacological purposes and detergent production.

In some production plants, the magnesium hydroxide is produced from a magnesium chloride brine and burnt dolomite, as well as with dead burned magnesium oxide, to be used mainly in the manufacturing of refractory bricks.

Looking for product diversification and added value for the product, applicants carried out trials for the production magnesium hydroxide for some of the above mentioned purposes.

The trials firstly started by using a magnesium hydroxide paste from the filters of the magnesium production plant, for acid effluent neutralization purposes, but the obtained product worked only when it was used immediately after its production, i.e. it is useful only in places near the production plants of the last product.

Therefore, when it is necessary to send the magnesium hydroxide paste or suspension to places far away from the production plant, as well as for further processing, it is necessary to store the magnesium hydroxide suspension for long terms in storing containers. Under such circumstances, the solid particles of the suspension normally tend to settle down producing a hard solid substrate as a hard cake in the bottom of the storing container, which is often very difficult to remove. The remaining suspension under such circumstances, results useless because it has not the required magnesium hydroxide concentration nor the required particle size in suspension and therefore it has to be poured from the storing container and discarded, to allow the elimination of the hard solid cake from the bottom of the container, increasing costs and high raw material loss.

Therefor, it would be highly desirable to produce a magnesium hydroxide suspension which could be stored for long terms without substantially settling nor cake formation.

U.S. Pat. No. 4,743,396 disclose a magnesium hydroxide slurry, for very specific purposes, having a concentration of 50% by weight or higher of $Mg(OH)_2$ and 0.1 to 5% of a sulfomethylated polyacrylamide which allow the slurry to be pumped through pipelines.

Furthermore, U.S. Pat. Nos. 4,164,521 (involving the use of a polyanionic polymer containing at least 50% mole of repetitive units derived from an acrylic acid and a poly-cathionic polymer); 4,412,844 (involving the use of 1.0 to 8.0% of a water dispersible, oil-soluble emulsifying agent); 4,155,741 (including an encapsulated material); and 3,957,674 (including at least 0.5% of sodium naphtalen-sulfonate), all of them disclose suspensions which when stored, showed some settlement but with the difference that when they are agitated, they recover their concentration and physical properties, but all of them do not mention a long term stability of about six months.

Because of its nature, a stabilized suspension can be more easily pumped than one which it is not stabilized because the last tends to form thickened particles and solid substrates complicating or even impeding to be pumped.

PCT published patent application No. PCT/AU95/00446 disclose an example of a magnesium hydroxide suspension having both characteristics of pumping and stability for about seven days without substantial agitation.

However, up to now, there is no suspension in the market having a long term stability of about six months.

In accordance with the present invention, a 50–60% magnesium hydroxide suspension, which Applicants named as "Neutromag TE", having a solid content between about 51% to 62%, a water content of from 38% to 49%, a viscosity of about 100 cp., a particle size of about 2 microns, a chloride content less that 0.4%, a calcium content of from 0.3% to 0.6%, a pH between about 11 to 12, an equivalent magnesium oxide content of 34% to 42%, a specific gravity of 1.4 to 1.5, and including one or more anionic polyelectrolytes as a dispersant agent, at a concentration of at least 25%, in an amount of about 0.5 to 1.5% in dry basis, showing a stability of at least six months without substantial agitation, is provided by a new process which will be disclosed below.

Because of the effect of the particle size (of about 2 microns) in combination with effect of using the anionic Polyelectrolyte as a dispersant agent, the six months stability of the "Neutromag TE" product is guarantee. In fact this product requires only somewhat (not vigorous) agitation once a day, in order to keep it fluid without experimenting particle thickening nor substantially settlement forming a hard solid cake.

Regarding the process for producing such magnesium hydroxide suspensions, this can be produced by adding a soluble alkaline material to an aqueous salt of magnesium at atmospheric pressure and at a temperature from a near ambient temperature to about 100° C.

U.S. Pat. No. 5,487,979 disclose a process for the production of magnesium hydroxide suspension, by pressure hydrating burnt natural magnesite in the presence of chlorine ions and a cationic polymer (polyamide).

U.S. Pat. Nos. 5143,965; 4,548,733; 4,430,248; 4,230,610; 4,166,040; and 4,166,041 disclose representative processes for producing magnesium hydroxide suspensions, by using ultrasonic mixing steps and some cationic polymers such as the ammonium metacriloxiethyl-trimethyl-methasulfonate and the polyacrylic acid, among others, showing more or less stability, but none disclosing a stability in the range of about six months.

It is therefore highly desirable to provide a new process for producing a long term stabilized magnesium hydroxide suspension which has a stability for at least six months without substantial agitation, and which do not settle down forming a hard solid cemented cake.

The process to produce the "Neutromag TE" magnesium hydroxide suspension, in accordance with the present invention, comprising basically dispersing a $Mg(OH)_2$ paste mainly comprising agglomerated $Mg(OH)_2$ crystals having a particle size of about 0.4 microns, by comminuting the solid paste reducing the particle size in a specialized comminuting equipment such as one having a cutting disc of a material named SS-316, rotating at high revolutions in the range of 1200 to 1300 RPM., and by including an anionic polyelectrolyte, as a dispersing agent, at a concentration of about 25%, in an amount of about 0.5 to 1.5% in dry basis, and subjecting the mixture to a grounding step in an equipment such as one using zirconium or stainless steel balls or media called SS 316 as grounding agent, to reduce the particle size to about 2 microns, in order to provide a long term stability of at least six months, to the suspension, without substantial agitation, and which do not settle down forming a hard solid cemented cake into the storing containers.

SUMMARY OF THE INVENTION.

It is therefore a main object of the present invention, to provide a long-term stabilized magnesium hydroxide suspension having a stability of at least six months without substantial agitation, having a very low tendency to settle down and to form a hard cemented cake.

It is another main object of the present invention, to provide a long-term stabilized magnesium hydroxide suspension, of the above disclosed nature, having a $Mg(OH)_2$ content of about 50% to 60%.

It is also a main objective of the present invention, to provide a long-term stabilized magnesium hydroxide suspension, of the above disclosed nature, having a solid content of about 51% to 62%.

It is still a main objective or tire present invention, to provide a long term stabilized magnesium hydroxide suspension of the above disclosed nature, having a particle size of about 2 microns.

It is jet a main objective of the present invention, to provide a long-term stabilized magnesium hydroxide suspension, of the above disclosed nature, having a viscosity of about 100 cp. (greater 150 cp.), a chloride content between about 0.2% to 0.3%, a calcium content of about 0.3% to 0.6%, a pH of about 11 to 12, an equivalent magnesium oxide content of 34% to 42%, a specific gravity of about 1.4 to 1.5 and a water content of about 38% to 49%, and an anionic polyelectrolyte as a dispersant agent, at a concentration of 40%, in an amount of about 0.5 to 1.5% in dry basis, which requires only somewhat of movement once a day to keep its fluid nature.

It is also a further main objective of the present invention, to provide a process to produce a long-term stabilized magnesium hydroxide suspension, having a stability of at least six months without substantial agitation, having a very low tendency to settle down and forming a hard cemented cake, including a specific dispersing step by comminuting the solid particles at a size of about 2 microns and incorporating an anionic polyelectrolitre as a dispersant agent, at a concentration of at least 25%, in an amount of about 0.5 to 1.5% in dry basis.

These and other objectives and advantages of the present invention will be apparent to those persons having ordinary skill in the art, from the following description of the invention, referring to specific examples of practice.

DETAILED DESCRIPTION OF THE INVENTION.

The invention will be described in the following by making reference to a preferred embodiment and some specific examples of the process and materials used to produce the long term "Neutromag TE" stabilized magnesium hydroxide suspension having a stability of at least six months without substantial agitation, and which has a very low tendency to settle down and to form a hard solid cemented cake.

The magnesium hydroxide $Mg(OH)_2$ named as "Neutromag TE" comes from a reaction of a magnesium chloride brine and "Dolime" which is a calcium and magnesium oxide obtained from the calcination of dolomite:

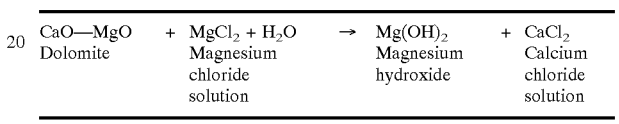

| Dolomite Chemical analysis | | Dolime Chemical Analysis | |
|---|---|---|---|
| MgO | 20.00% | MgO | 39.60% |
| CaO | 31.00% | CaO | 57.60% |
| $Fe_2O_3$ | 0.03% | $Fe_2O_3$ | 0.06% |
| $Al_2O_3$ | 0.04% | $Al_2O_3$ | 0.08% |
| $SiO_2$ | 0.04% | $SiO_2$ | 0.08% |
| | | $CO_2$ | 0.12% |

From the reaction of the magnesium chloride with the "Dolime" a precipitated magnesium hydroxide is obtained in a calcium chloride liquor, in accordance with the following reaction:

| CaO—MgO Dolomite | + | $MgCl_2 + H_2O$ Magnesium chloride solution | → | $Mg(OH)_2$ Magnesium hydroxide | + | $CaCl_2$ Calcium chloride solution |
|---|---|---|---|---|---|---|

The magnesium hydroxide from this reaction is the one used in the process for producing the magnesium hydroxide suspension called "Neutromag TE", comprising:

washing the magnesium hydroxide;

filtering and repulping the magnesium hydroxide solids in order to obtain less than 0.4% of chloride values; this material (50% of the product) has a particle size ratio of 10 microns which are mainly crystals of agglomerated $Mg(OH)_2$, having a crystal size ratio of about 0.4 microns;

dispersing the agglomerated solid particles by comminution in a dispersing equipment having a cutting disc of a material known as SS 316 rotating at high revolutions (1200 to 3000 RPM.) for about 20 to 30 minutes, in order to reduce the particle size;

grinding the dispersed product in a sand mill such as one using zirconium or stainless steel balls having a diameter less than 1.5 mm, as a milling media, to additionally reduce the particle size to guarantee that at least the 50% of the product have a particle size of about 2 microns, because the more fines, the more stabilization is obtained;

adding one or more anionic polyelectrolytes at a concentration of at least 25% in an amount of about 0.5 to 1.5% in dry basis, as dispersant agent which favor the stability of the suspension by providing electric charges which reduce the tendency of the particles to agglomerate and settle down, favoring its stabilization; and storing the so obtained magnesium hydroxide suspension in a storing tank wherein it can be stored for at least six months without substantially agitation without experimenting tendency to settle down forming a hard solid cake in the bottom of the storing tank, nor particle thickening of the solid particles of the suspension.

Applicants have found that the grinding step is necessary because, although the product obtained in the dispersion step has a low viscosity and consequently a good fluidity, still do not has the required characteristic of particle size to promote the desired stability because some of the particles still have a size of about 4 to 10 microns and undergo a tendency to settle down sometimes in few hours.

Furthermore, although the particle size obtained by the milling step undergo less tendency to settle down, this alone still does not guarantee the long term stabilization which is desired and therefore, it is necessary to include the anionic polyelectrolyte for the obtention of the desired stability in combination with the particle size.

The anionic polyelectrolytes are macromolecules originated from monomeric units with ionizable groups as opposed to a simple electrolyte such as the sodium chloride in which the cathion $Na^+$ and the anion $Cl^-$ are relectively small and simmilar in size. A polyelectrolyte is characterized by a macro-ion which is the spinal column (a large ion having a similar number of charged groups conected by bonds) and an equivalent number of independant small charges and of opposite charge. Because of their high molecular wheight these are also known as dispersant resins.

Examples of anionic polyelectrolytes are the sodium polyacrylate, potasium polyacrylate, ammonium polyacrylate, and ammonium poly(styrene/maleate), among others.

The following are examples of the specific process for obtaining the magnesium hydroxide suspension "Neutromag TE", in accordance with the present invention.

EXAMPLE 1

A magnesium hydroxide paste from a plant of Quimica del Rey having a solid content of 55% were divided in four portions to evaluate the same number (four) of dispersing agents at diverse concentrations of anionic polyelectrolytes, each of which was added in amounts of 1,1%, 1.5% and 1.75% to each of the respective portions.

Subsequently, the viscosity of such portions was determined. The resultant viscosity of each of the portions is as follows:

| Dispersant concentration | Viscosity in centipoises in each doses | | |
|---|---|---|---|
| | 1.1% | 1.5% | 1.75% |
| 39% | 120 | 90 | 190 |
| 31% | 130 | 150 | 250 |
| 35% | 125 | 100 | 250 |

Once the viscosity was determined, each of the samples were grounded in a grounding equipment to reduce the average particle size.

After six months of observation, each of the samples substantially shown low sedimentation and conserved its fluid nature.

EXAMPLE 2

A magnesium hydroxide paste sample having a solid content of 52% was obtained from the filters of the magnesium hydroxide production plant, with an equivalent weight of 2 Kg and a magnesium hydroxide base. Various dispersants agents at diverse concentrations of anionic polyelectrolytes were added to the paste varying their amounts to 0.3%, 0.6%, 0.9%, 1.2% and 1.5%. Later, the viscosity of the past was determined. The results are shown in the following table:

| Dispersant concentration | Doses (%) | Viscosity |
|---|---|---|
| 31% | 0.3 | >1660 |
| | 0.6 | >1660 |
| | 0.9 | >1660 |
| | 1.2 | >1660 |
| | 1.5 | 1350 |
| 44% | 0.3 | >1660 |
| | 0.6 | >1660 |
| | 0.9 | >1660 |
| | 1.2 | 290 |
| | 1.5 | 80 |
| 39% | 0.3 | >1660 |
| | 0.6 | >1660 |
| | 0.9 | >1660 |
| | 1.2 | 60 |
| | 1.5 | 75 |

The samples whit a viscosity value less than 300 cp., were grounded during 15 minutes.

The viscosity of the grounded samples is shown in the next table:

| Dispersant concentration | Doses (%) | Viscosity (cp.) |
|---|---|---|
| 31% | 1.5 | >1660 |
| 44% | 1.2 | >1660 |
| | 1.5 | 120 |
| 39% | 1.2 | >1660 |
| | 1.5 | 170 |

EXAMPLE 3

A magnesium hydroxide paste sample having a solid content of 52% was obtained from the filters of the magnesium hydroxide production plant. Various dispersant agents at diverse concentrations were added to the paste and the pH of the obtained suspension was adjusted after dispersing, in order to decrease the viscosity of such suspension.

The weight of the sample was 2 kg, having a magnesium hydroxide base. The results of the experiment are shown in the next table.

| Dispersant concentration | Doses (%) | Ml of NaOH (50%) | pH | Viscosity |
|---|---|---|---|---|
| 39% | 0.9 | — | 9.9 | >1660 |
| | 0.9 | 1.5 | 11.4 | 250 |
| | 1.2 | — | 11.4 | 130 |
| 35% | 0.9 | — | 9.9 | >1660 |
| | 0.9 | 1.5 | 11.1 | 50 |
| | 1.2 | — | 11.3 | 35 |
| 55% | 1.2 | — | 10.1 | >1660 |
| | 1.2 | — | 11.3 | 35 |

The samples with a viscosity value less than 400 cp., were grounded in order to reduce the average particle size. In some samples an additional 0.3% of dispersant was added.

The results of the experiment are shown in the next table:

| Dispersant concentration | Total doss (%) | pH | Viscosity |
|---|---|---|---|
| 39% | 1.2 | 11.5 | 199 |
| | 1.5 | 11.5 | 83 |
| | 1.5 | 11.6 | 58 |

-continued

| Dispersant concentration | Total doss (%) | pH | Viscosity |
|---|---|---|---|
| 35% | 1.2 | 11.3 | 33 |
|  | 1.5 | 11.4 | 20 |
|  | 1.5 | 11.5 | 33 |
| 55% | 1.5 | 11.5 | 149 |

All the samples in the experiment kept its fluid nature.

Commercial products including anionic polyelectrolytes such as the sodium polyacrylate, potasium polyacrylate, ammonium polyacrylate, and ammonium poly(styrene/maleate), at diverse concentrations, were rested from diverse companies which sell them under different trademarks, such as the "Busperse" sold by Buckman Laboratories; Crisperse sold by Christianson S. A. de C. V.; Nopcosperse sold by Henkel Corporation; Dalesol sold by Dalequimica, S. A. Other products including anionic Polyelectrolytes were also tested providing satisfactory results were Daxad, Tamol, and Nalco.

The magnesium hydroxide suspension "Neutromag TE" obtained in the above disclosed ways, presented the following characteristics:

|  | Range | Preferred |
|---|---|---|
| Mg(OH)$_2$ content, % | 50–60 | 55 |
| Equivalent Magnesium Oxide, % | 34–42 | 38 |
| Solid content, % | 51–62 | 56 |
| Water, % | 38–49 | 44 |
| Chloride, % Cl | 0.2–0.3 | 0.24 |
| Calcium, % Ca | 0.3–0.6 | 0.45 |
| Specific gravity | 1.4–1.5 | 1.47 |
| Ph | 11–12 | 11.7 |
| Viscosity, cp. at 25° C. | 50–400 | 100 |
| Average particle size, microns | 1–2 | 1.7 |
| 5–10 microns, % | 5–15 | 10 |
| 2–5 microns, % | 30–40 | 35 |
| 1–2 microns, % | 25–35 | 30 |
| 0.5–1 microns, % | 20–30 | 25 |
| Appearance |  | White suspension |
| Stability |  | At least 6 months |

We claim:

1. A long term stabilized magnesium hydroxide suspension, having a solids content of about 51% to 62%; a water content of about 38% to 49%; a viscosity of about 50 to 400 cp.; an average particle size of about 1 to 2.5 microns; a Mg(OH)$_2$ content of about 50% to 60%; a chloride content less than 0.4% on a dry basis; a calcium content of about 0.3% to 0.6% on a dry basis; a pH of about 10.5 to 12; an equivalent magnesium oxide content of 34% to 42%; a specific gravity of 1.4 to 1.5; and including at least one anionic polyelectrolyte as a dispersant agent, at a concentration of at least 25%, in an amount of about 0.5 to 1% on a dry basis; which can be stored for at least six months without substantial agitation without undergoing solid hard substrate formation.

2. The long term stabilized magnesium hydroxide suspension, as claimed in claim 1, wherein the anionic polyelectrolyte is selected from the group consisting of sodium polyacrylate, potasium polyacrylate, ammonium polyacrylate, and ammonium poly(styrene/maleate).

3. The long term stabilized magnesium hydroxide suspension, as claimed in claim 1, wherein 5 to 15% of the total of solids of the suspension have a particle size of 5 to 10 microns; 30 to 40% of the total of solids of the suspension having a particle size of 2 to 5 microns; 25 to 35% of the total solids of the suspension having a particle size of 1 to 2 microns; and 20 to 30% of the total of solids of the suspension having a particle size of 0.5 to 1 microns.

4. A long term stabilized magnesium hydroxide suspension having about 55% of solids; 44% of water; a viscosity of about 100 cp.; an average particle size of about 1.7 microns; Mg(OH)$_2$ content of about 55%; 0.24% of chloride; calcium content of about 45%; a pH of about 11.7; an equivalent magnesium oxide content of 38%; a specific gravity of 1.47; including at least one anionic polyelectrolyte as a dispersant agent, at a concentration of about 40%, in an amount of 1% in dry basis; which can be stored for at least six months without substantial agitation without undergoing solid hard substrate formation.

5. The long term stabilized magnesium hydroxide suspension, as claimed in claim 4, wherein 10% of the total of solids of the suspension have a particle size of 5 to 10 microns; 35% of the total solids of the suspension having a particle size of 2 to 5 microns; 30% of the total solids of the suspension having a particle size of 1 to 2 microns; and 25% of the total solids of the suspension having a particle size of 0.5 to 1 microns.

6. A process for the production of a long term stabilized magnesium hydroxide suspension, from magnesium hydroxide solids obtained from a step of a process for the preparation of dead burned magnesium oxide, comprising:
   washing the magnesium hydroxide solids;
   filtering and repulping the magnesium hydroxide solids to obtain agglomerated solid particles having less than 0.4% of chloride values;
   dispersing the agglomerated solid particles by comminution in a dispersing equipment, to reduce the particle size of the solid particles, providing a dispersed product;
   grinding the dispersed product, to additionally reduce the particle size so that at least 50% of the ground product has a particle size of about 2 microns; and
   adding at least one anionic polyelectrolyte as a dispersant agent, at a concentration of at least 25%, in an amount of about 0.5 to 1.5% on a dry basis, which increases the length of time the suspension is stable.

7. The process as claimed in claim 6, wherein the filtering and repulping steps are carried out twice.

8. The process as claimed in claim 6, wherein about 50% of the dispersed product has a particle size ratio of about 10 microns and comprising crystals of agglomerated Mg(OH)$_2$, having a crystal size ratio of about 0.4 microns.

9. The process as claimed in claim 6, wherein the dispersing of the agglomerated solid particles is carried out in a dispersing equipment having a cutting disc of a material known as SS 316 rotating at about 1200 to 3000 RPM.

10. The process as claimed in claim 6, wherein the dispersing step is carried out for about 20 to 30 minutes.

11. The process as claimed in claim 6, wherein the grinding step is carried out in a sand mill using zirconium or stainless steel balls having a diameter less than 1.5 mm, as a milling media.

12. The process as claimed in claim 6, wherein the anionic polyelectrolyte is selected from the group consisting of sodium polyacrylate, potasium polyacrylate, ammonium polyacrylate and ammonium poly(styrene/maleate) which, in combination with the particle size of the ground product, increases the length of time the suspension is stable by providing electric charges reducing the tendency of the particles to agglomerate and settle out.

* * * * *